United States Patent [19] [11] Patent Number: 4,972,132
Kitano et al. [45] Date of Patent: Nov. 20, 1990

[54] STEPPING MOTOR DRIVE CONTROL CIRCUIT FOR A MAGNETIC DISK DRIVE

[75] Inventors: Takamasa Kitano; Terumitsu Okamoto, both of Tokyo, Japan

[73] Assignee: NEC Corporation, Tokyo, Japan

[21] Appl. No.: 410,457

[22] Filed: Sep. 21, 1989

[30] Foreign Application Priority Data

Sep. 21, 1988 [JP] Japan ................. 63-237742

[51] Int. Cl.$^5$ ............................... H02P 8/00
[52] U.S. Cl. ....................... 318/696; 318/685; 318/701; 318/671; 360/78.04; 360/78.13
[58] Field of Search .......... 318/696, 685, 701, 671; 360/78.04, 78.13

[56] References Cited

U.S. PATENT DOCUMENTS 4,779,033 10/1988 Morita .................... 318/696
4,831,471 5/1989 Tsujisawa ................ 360/78.04
4,881,161 11/1989 Thompson ............... 318/671 X Primary Examiner—William M. Shoop, Jr.
Assistant Examiner—Saul M. Bergmann
Attorney, Agent, or Firm—Sughrue, Mion, Zinn, Macpeak & Seas

[57] ABSTRACT

A circuit for controllably and finely driving a stepping motor, which moves a magnetic head over a magnetic disk, by using the combination of current values which are individually approximated to a sine wave and a cosine wave. The circuit allows a magnetic head to move at a high speed across the tracks of a magnetic disk toward a desired track, while after such a movement of the head lowering the remaining oscillation frequency of the stepping motor to allow servo to be applied immediately, thereby enhancing rapid operations of the apparatus.

2 Claims, 3 Drawing Sheets

STEPPING MOTOR DRIVE CONTROL CIRCUIT FOR A MAGNETIC DISK DRIVE

BACKGROUND OF THE INVENTION

The present invention relates to a magnetic disk drive and, more particularly, to a magnetic disk drive having a circuit for controllably driving a stepping motor which moves a magnetic head.

A magnetic drive disk such as a floppy disk drive has customarily been provided with a stepping motor or similar drive source for driving a magnetic head. A stepping motor for this kind of application is driven by current values which are representative of desired driving conditions. With a conventional floppy disk drive, only a single combination of current values is available for driving a stepping motor as disclosed in U.S. Pat. Nos. 4,788,608 and 4,831,471. In the conventional floppy disk drive, a stepping motor exerts a static torque having a constant gradient. Hence, if the absolute value of the static torque is increased in order to increase the moving speed of the motor, the specific oscillation frequency of the motor in the energized state and, therefore, the frequency of oscillation which remains after the deenergization of the motor will be increasred. In this condition, assuming that the stepping motor is controlled on a sector servo basis which is well known in the art, then the servo cannot act on the motor immediately due to the oscillation of the motor. Especially, when the oscillation frequency approaches the sampling frequency of a servo motor, the servo will practically fail to work because the oscillation is apparently stopped despite that it is under way.

SUMMARY OF THE INVENTION

It is therefore an object of the present invention to provide a stepping motor drive control circuit for a magnetic disk drive which enhances rapid operations of the disk drive.

It is another object of the present invention to provide a stepping motor drive control circuit for a magnetic disk drive which causes a magnetic head to move at a high speed across the tracks of a magnetic disk and, thereafter, lowers the remaining oscillation frequency of a stepping motor to allow servo to work immediately.

It is another object of the present invention to provide a generally improved stepping motor drive control circuit for a magnetic disk drive.

According to the present invention, a circuit for controllably and finely driving a stepping motor, which moves a magnetic head over a magnetic disk. by using a combination of current values which are individually approximated to a sine wave and a cosine wave, comprises a first current value memory storing a combination of first current values which are to be fed to the stepping motor to move the magnetic head to a target track of the magnetic disk, a second current value memory storing a combination of second current values smaller than the first current values in absolute value which are to be fed to the stepping motor to move the magnetic head within a small range after the magnetic head has reached the target track, and a controller for switching the first and second current value memories from one to the other.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
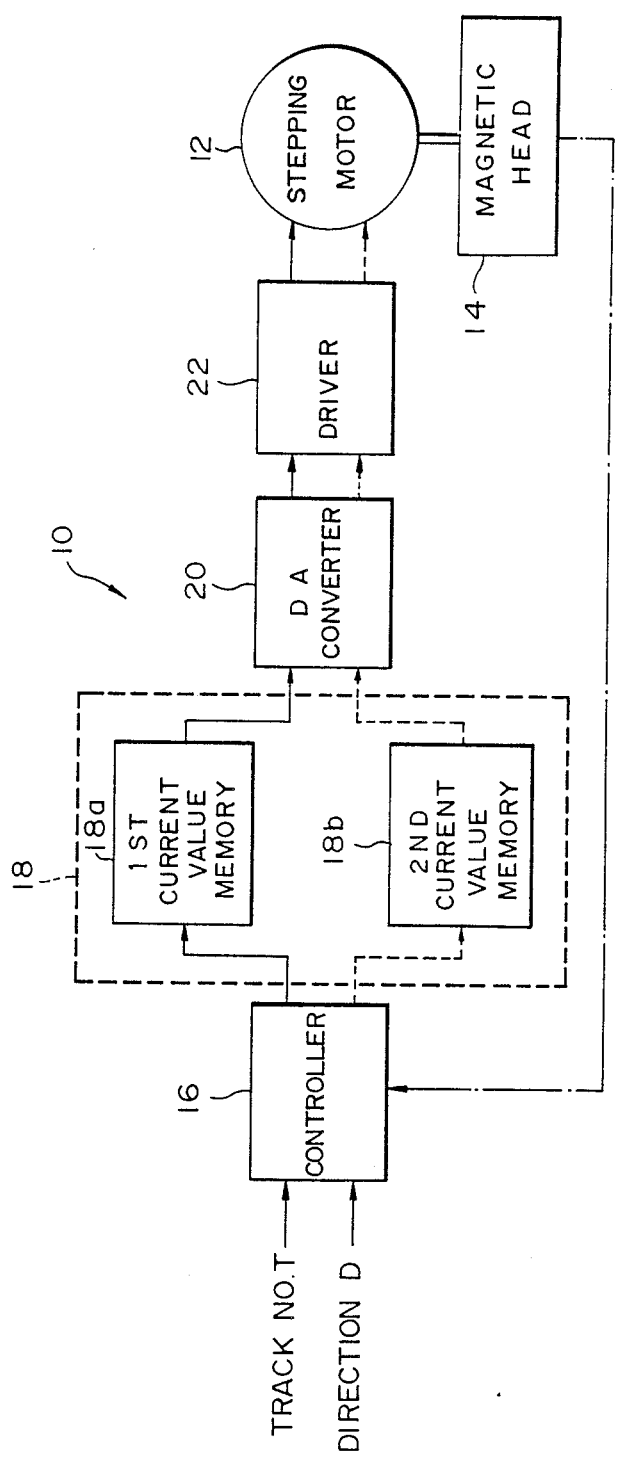
FIG. 1 is a schematic block diagram showing a stepping motor drive control circuit embodying the present invention and which is applied to a floppy disk apparatus.

Referring to FIG. 1 of the drawings, a stepping motor drive control circuit embodying the present invention is shown and generally designated by the reference numeral 10. The drive control circuit 10 controllably drives a two-phase stepping motor 12 which in turn moves a magnetic head 14 over a magnetic disk, not shown. As shown, the circuit 10 has a controller 16, a current value storage 18, a digital-to-analog (DA) converter 20, and a driver 22. The current value storage 18 is made up of a first current value memory 18a and a second current value memory 18b.

In a track seek mode, the controller 16 reads current values out of the first current value memory 18a on the basis of a commanded target track number T and a commanded direction D of movement. On the other hand, in a track follow mode, the controller 16 reads current values out of the second current value memory 18a in association with position errors being read out of the magnetic disk via the magnetic head 14. The digital cureunt values so read out are converted into analog values by the DA converter 20 so as to drive the stepping motor 12 via the driver 22. In response, the stepping motor 12 moves the head 14 in the radial direction of the magnetic disk.

The magnetic disk has sectors each being headed by servo information, as taught in U.S. Pat. Nos. 4,788,608 and 4,831,471 by way of example. The locations where the servo information are recorded are detected by a technology which is disclosed in U.S. patent application Ser. No. 07/219,545 filed on July 15, 1988. The stepping motor may be implemented by a linear motor which is shown and described in U.S. patent application Ser. No. 07/213,864 filed on June 30, 1988. In FIG. 1, lines used for the controls in thr track seek mode and track follow mode are indicated schematically by arrow-headed solid lines and arrow-headed dash-and-dot lines, respectively.

Figure 2:
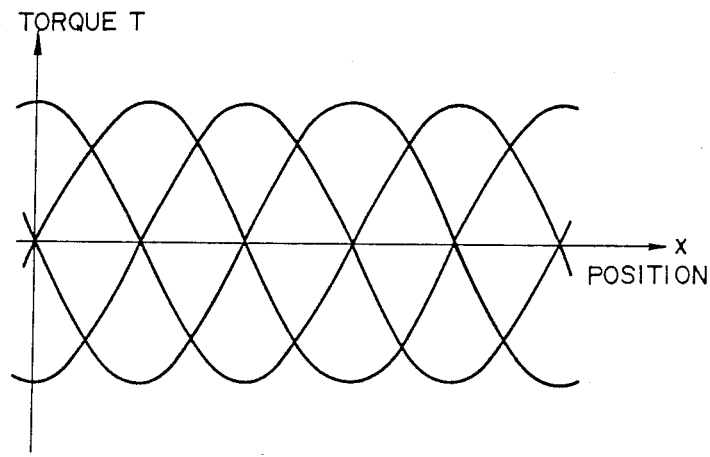
FIG. 2 shows curves representative of a static torque characteristic of a stepping motor.
Figure 3A:
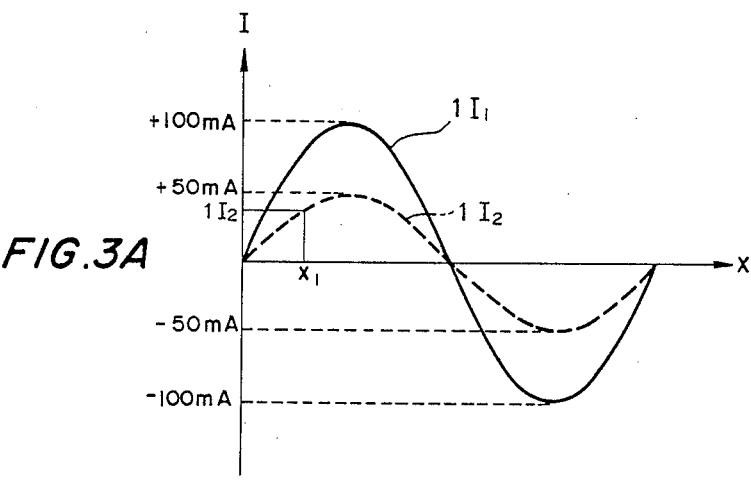
FIGS. 3A and 3B show waveforms representative of different current values which the illustrative embodiment applies to a stepping motor selectively.
Figure 3B:
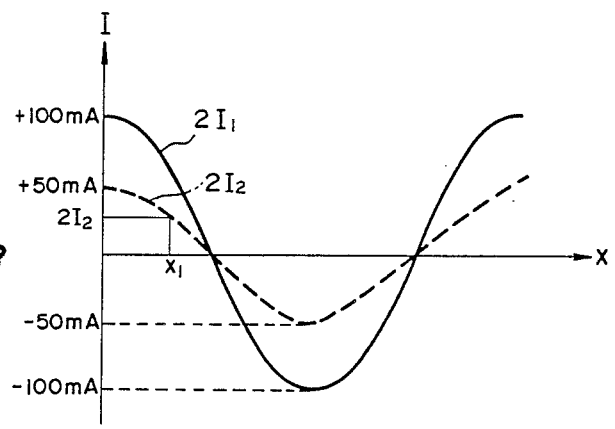

The static torque charcteristic of the stepping motor 12 may be approximated by sinusoidal curves, as shown in FIG. 2. The current value storage 18 is loaded with current values for driving the stepping motor 12 which are shown in FIGS. 3A and 3B. Specifically, the first current value memory 18a is assigned to the track seek mode and stores therein current values $1I_1$ and $2I_1$ which are respectively the combinations of current values to be fed to the first and second phases of the two-phase stepping motor 12, as indicated by solid curves in FIGS. 3A and 3B. Assigned to the track follow mode, the second current value memory 18b stores the combinations of current values $1I_2$ and $2I_2$ which are indicated by phantom curves in FIGS. 3A and 3B. The current values $1I_2$ and $2I_2$ are the same as rhe current values $1I_1$ and $2I_1$ with respect to the phase, but the former is one half the latter with respect to the absolute value. That is, the former has an absolute value of 50 mA in maximum while the latter has an absolute value of 100 mA in maximum. In FIGS. 3A and 3B, the abscissa and ordinate are representative of the position x and current I, respectively.

The drive control circuit 10 having the above construction will be operated as follows.

In a track seek mode for moving the magnetic head 14 from a current track toward a target track of a magnetic disk, the controller 16 sequentially reads the current values $1I_1$ and $2I_1$ out of the first current value memory 18a in response to a target track number T and a direction D of movement. The current values $1I_1$ and $1I_2$ are then routed through the DA converter 20 and drive 22 to the stepping motor 12. More specifically, the current values $1I_1$ in the form of a sine curve and the current values $2I_1$ in the form of a cosine curve are repectively fed to the first phase and the second phase of the stepping motor 12. Consequently, the stepping motor 12 is driven by a commanded number of steps by open loop control. As soon as the stepping motor 12 moves the magnetic head 14 across the tracks of the disk to a target track, the magnetic disk drive enters into a track follow mode operation.

In the track follow mode, servo information recorded in the magnetic disk are sequentially read out by the head 14 and applied to the control 16. By using each servo information, the controller 16 determines a displacement $x_1$ of the head 14 from the center line of the target track, as shown in FIGS. 3A and 3B. Then, the control 16 accesses the second current value memory 18b with the displacement $x_1$ so as to read current values $1i_2$ and $2i_2$, as shown in FIGS. 3A and 3B, thereoutof. The first and second phase of the stepping motor 12 are energized by the current values $1i_2$ and $2i_2$, respectively. More specifically, the current values $1i_2$ and $2i_2$ are converted into analog values by the DA converter 20 and then applied to the stepping motor 12 via the driver 22. As a result, the head 14 is finely moved in the radial direction of the disk until it reaches the center of the target track.

Figure 4:
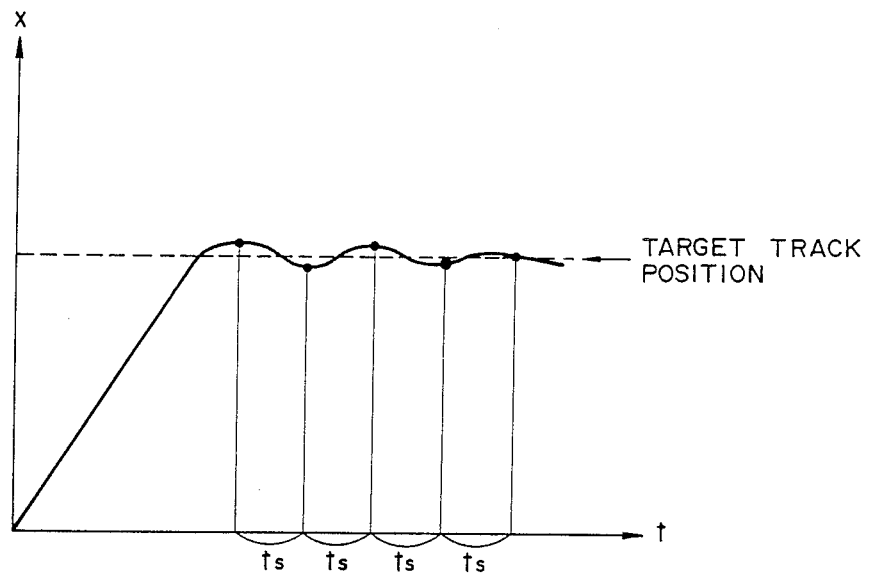
FIG. 4 shows a curve representative of a locus of movement of a magnetic head which is implemented by the combinations of current values of the illustrative embodiment.

FIG. 4 indicates a locus of movement of the magnetic head 14 attainable with the illustrative embodiment. Specifically, the illustrative embodiment uses the first currrent values $1I_1$ and $2I_1$ indicated by solid curves and the second current values $1I_2$ and $2I_2$ indicated by phantom curves, as shown in FIGS. 3A and 3B. While the magnetic head 14 is moved across the tracks of a magnetic disk, the first or greater current values $1I_1$ and $2I_1$ are used to increase the moving speed of the head 14. After such a movement of the head 14, the second or smaller current values $1I_2$ and $2I_2$ are used in place of $1I_1$ and $2I_1$. This causes the head 14 to move along a unique locus as indicated in FIG. 4. In this condition, the oscillation of the stepping motor 12 can be read at the sampling period $t_s$ of the servo information.

Figure 5:
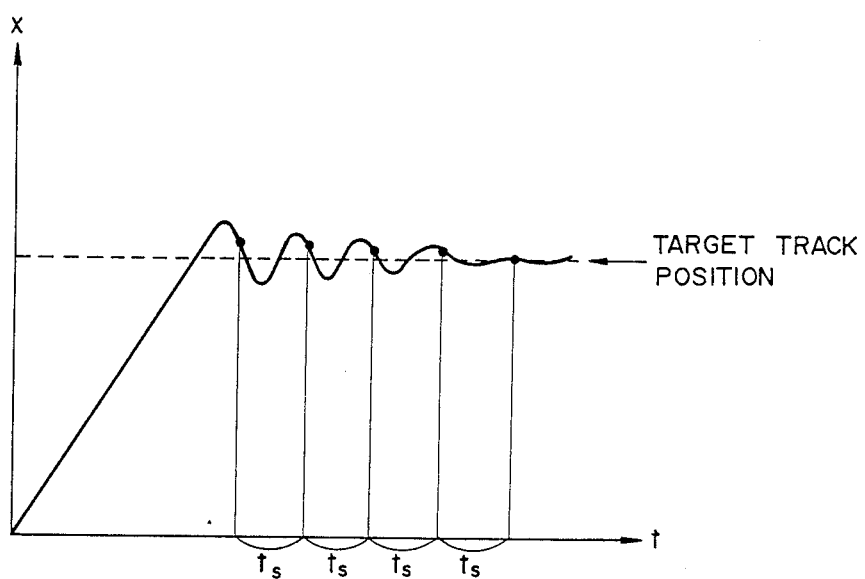
FIG. 5 is a view similar to FIG. 4, showing a locus of movement of a magnetic head which is caused by a conventional combination of current values.

In contrast, it has been customary to provide a stepping motor drive control circuit with only a single combination of current values. Should such a drive control curcuit be implemented with the combination of relatively high current values for the purpose of increasing the moving speed of a stepping motor, a magnetic head would be moved as represented by a locus in FIG. 5. This is because the specific oscillation frequency of the stepping motor is increased due to the great current values, and therefore the oscillation frequency after the stop of the stepping motor is increased. In the condition shown in FIG. 5, it is impossible to read the oscillation of the stepping motor at the sampling period $t_s$ of a servo information.

In summary, in accordance with the present invention, a stepping motor drive control circuit for a magnetic disk drive uses the combination of first current values and the combination of second current values selectively. The circuit allows a magnetic head to move at a high speed across the tracks of a magnetic disk toward a desired track, while after such a movement of the head lowering the remaining oscillation frequency of the stepping motor to implement immediate application of servo, thereby enchance rapid operations of the drive.

Various modifications will become possible for those skilled in the art after receiving the teachings of the present disclosure without departing from the scope thereof.

What is claimed is:

1. A circuit for controllably and finely driving a stepping motor, which moves a magnetic head over a magnetic disk, by using a combination of current values which are individually approximated to a sine wave and a cosine wave, said circuit comprising:

first current value memory means storing a combination of first current values which are to be fed to the stepping motor to move the magnetic head to a target track of the magnetic disk;

second current value memory means storing a combination of second current values smaller than said first current values in absolute value which are to be fed to the stepping motor to move the magnetic head within a small range after said magnetic head has reached the target track; and control means for switching said first current value memory means and said second current value memory means from one to the other.

2. A circuit as claimed in claim 1, wherein each of the first and second current values stored in said first and second current value memory means, respectively, comprise current values in the form of a sine wave to be fed to first phase of the stepping motor and current values in the form of a cosine wave to be fed to a second phase of said stepping motor.

* * * * *

UNITED STATES PATENT AND TRADEMARK OFFICE
CERTIFICATE OF CORRECTION

PATENT NO. : 4,972,132
DATED : November 20, 1990
INVENTOR(S) : KITANO et al

It is certified that error appears in the above-identified patent and that said Letters Patent is hereby corrected as shown below:

Col. 1, line 26, delete "increasred" and insert --increased--;

Col. 2, line 45, delete "cureent" and insert --current--;

Col. 2, line 59, delete "thr" and insert --the--;

Col. 3, line 9, delete "rhe" and insert --the--;

Signed and Sealed this

First Day of September, 1992

Attest:

DOUGLAS B. COMER

*Attesting Officer*  *Acting Commissioner of Patents and Trademarks*